United States Patent [19]

Hill

[11] 4,040,238

[45] Aug. 9, 1977

[54] ROW CROP ROGUE VEHICLE

[76] Inventor: Fred L. Hill, 516 S. Ash, McPherson, Kans. 67460

[21] Appl. No.: 648,933

[22] Filed: Jan. 14, 1976

[51] Int. Cl.² .......................................... A01D 23/00
[52] U.S. Cl. ...................................... 56/167; 56/210; 56/126
[58] Field of Search .................... 56/11.9, 14.3, 14.4, 56/14.5, 56–58, 122–124, 126, 208, 210, 214, 217; 280/6 H, 43, 43.23

[56] References Cited

U.S. PATENT DOCUMENTS

| 3,096,605 | 7/1963 | Claas | 56/167 |
| 3,319,408 | 5/1967 | Landwehr | 56/220 |
| 3,909,022 | 9/1975 | Claxton | 280/6 H |

Primary Examiner—Russell R. Kinsey
Attorney, Agent, or Firm—John H. Widdowson; Edwin H. Crabtree

[57] ABSTRACT

A row crop rogue vehicle for removing rogue crops such as shatter cane, rye, weeds or the like. The seed heads of the rogue crops are taller than the cultivated crops in a field. The rogue vehicle is self-propelled with wheels mounted on the ends of hydraulic cylinders. The cylinders are used for raising the frame of the vehicle above the height of the cultivated crops. The wheels and cylinders are transversely adjustable on the vehicle frame to the direction of travel of the vehicle so that the wheels can ride between the crop rows of fields having different crop row widths. The front of the vehicle includes a cutting sickle and reel for cutting the rogue crops which are conveyed to a storage hopper mounted at the rear of the vehicle.

2 Claims, 3 Drawing Figures

ROW CROP ROGUE VEHICLE

BACKGROUND OF THE INVENTION

This invention relates generally to farm vehicles and more particularly but not by way of limitation to a self-propelled vehicle for harvesting rogue crops in a cultivated field.

Heretofore farmers have been plagued with rogue crops such as shatter cane, rye, weeds, etc. which are intermixed with cultivated crops such as corn, milo, or wheat. The rogue crops characteristically grow faster and larger than the cultivated crops and often will become so prolific that the land becomes unsuitable for farming.

The rogue crops are normally removed from the field by hand which requires a great deal of time, expense, and labor.

If the rogue crops are not removed by hand they are harvested along with the cultivated crops. This produces an inferior product due to the contamination of the seeds from the rogue crops.

The farm land can be treated with weed sprays or the like to kill the rogue crops prior to the planting of the crop. This treatment of the farm land is expensive, requires special equipment, and is time consuming.

Prior to the subject invention there has been no disclosure of a self-propelled vehicle for harvesting rogue crops prior to the harvesting of the cultivated crop.

SUMMARY OF THE INVENTION

The rogue vehicle cuts and stores the seed heads of the rogue crop to prevent the seeds from the seed heads from falling on the ground surface and proliferating additional rogue crops to the detriment of the farmer.

The vehicle eliminates removing the rogue crop by hand and prevents the seed heads from contaminating the cultivated crop when they are harvested together.

The vehicle is self-propelled and adjustable for straddling row crops having dfferent widths.

Through the use of wheels mounted on the end of hydraulic cylinders, the vehicle frame can be raised or lowered to a desired height above the cultivated crops during various stages of growth.

The rogue vehicle includes wheels mounted at one end of hydraulic cylinders. The other end of the hydraulic cylinders are mounted on the bottom portion of a vehicle frame. The vehicle further includes a motor drive and hydraulic drive for driving the wheels and the hydraulic cylinders. Mounted in front of the vehicle frame is a cutting sickle, reel, and auger for harvesting the rogue crop and feeding the rogue crop onto a ribbed conveyor. The ribbed conveyor conveys the cut seed heads into a storage hopper which is mounted on the rear of the vehicle frame. The storage hopper includes a foldable hopper conveyor for conveying the stored seed heads from the hopper to an adjacent vehicle which transports the cut seed heads away from the cultivated field.

The advantages and objects of the invention will become evident from the following detailed description when read in conjunction with the accompanying drawings which illustrate the preferred embodiments of the invention.

DETAILED DESCRIPTION OF THE DRAWINGS

Figure 1:
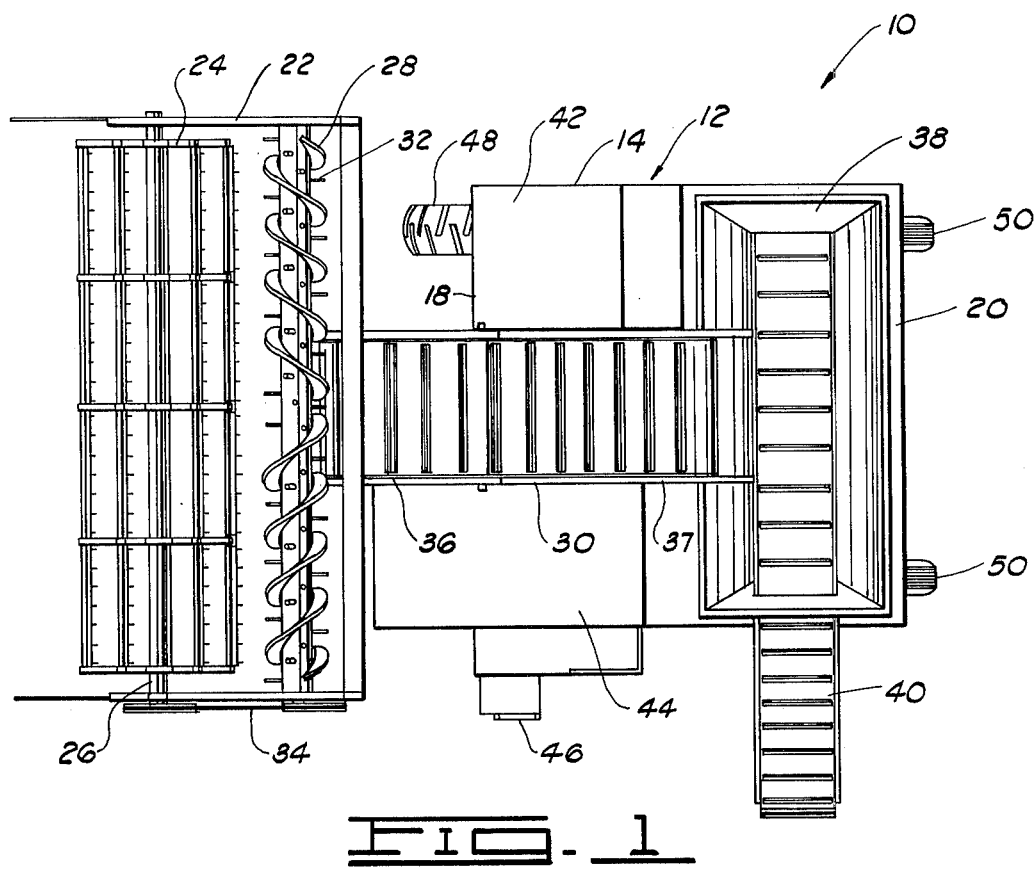
FIG. 1 is a top view of the row crop rogue vehicle.

In FIG. 1 the row crop rogue vehicle is characterized by general reference numeral 10. The vehicle 10 includes a frame 12 having a top portion 14, a bottom portion 16 shown in FIG. 2, a front portion 18, and rear portion 20.

Attached to the front portion 18 of the frame 12 is a reel frame 22 having a reel 24 mounted thereon and coacting with a cutting sickle 26 for cutting the rogue crops. When the cutting sickle 26 cuts the rogue crops the cutting reel 24 moves the cut seed heads rearwardly in the reel frame where the cut seed heads are received by an auger 28. The auger 28 moves the cut seed heads toward the center of the reel frame 22 where the cut seed heads are discharged onto a chain driven ribbed conveyor 30. The auger 28 includes retractable tines 32 which aid the auger 28 in moving the cut seed heads onto the conveyor 30. The reel 24 and auger 28 are driven by a drive belt 34. The drive belt 34, the chain driven ribbed conveyor 30, and the cutting sickle 26 are all connected and driven by mechanical linkage to the vehicle's motor. The linkage is not shown in the drawings. The linkage may be any acceptable type of mechanical means for connecting to the vehicle's motor.

The ribbed conveyor 30 is inclined upwardly from the rear of the reel frame 22 toward the rear portion 20 of the frame 12. The conveyor 30 includes a first section 36 disposed adjacent the auger 28 and an adjustable second section 37 which has a rear end portion that is disposed above a storage hopper 38 which receives the cut seed heads from the ribbed conveyor 30 and stores them therein. Disposed at the bottom of the hopper 38 and extending outwardly from one side thereof is a hopper conveyor 40 which conveys the stored seed heads from the storage hopper 38 into a vehicle parked adjacent the rogue vehicle 10 for transporting the cut seed heads away from the cultivated field.

The vehicle 10 further includes a motor housing 42 attached to the top portion 14 of the frame 12 which encloses the vehicle's motor drive, fuel tank, and hydraulic tank.

Also attached to the top portion 14 of the vehicle frame 12 is the vehicle's cab 44 which houses the vehicle's steering wheel, driving seat, and the various vehicle instruments required in driving the vehicle 10. Suspended from the side of the vehicle cab 44 is a ladder 46 for providing access into the cab 44.

Figure 2:
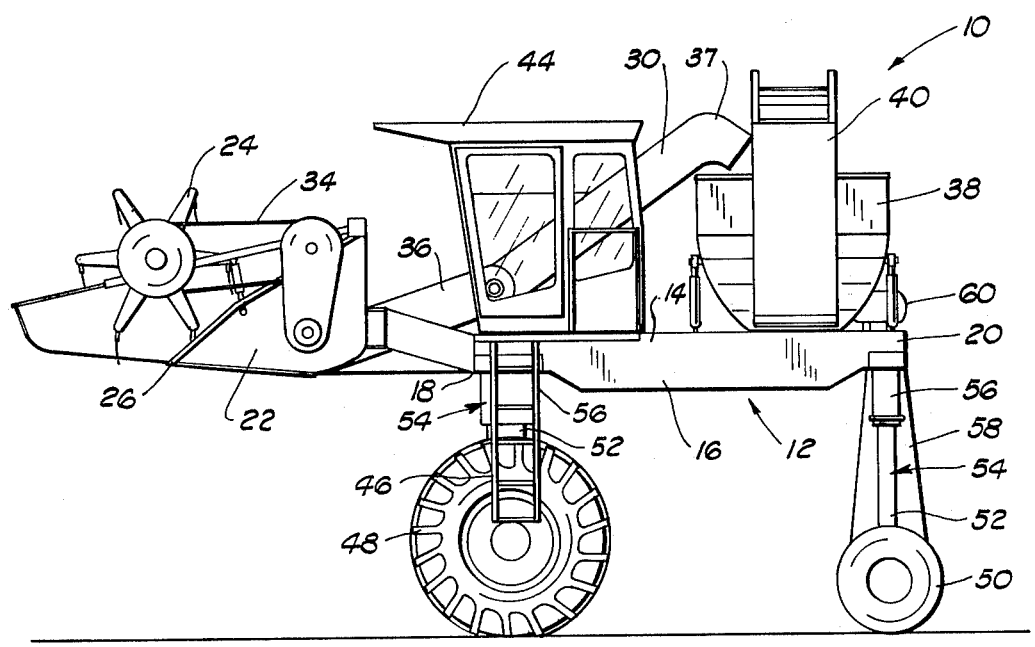
FIG. 2 is a side view of the vehicle.

In FIG. 2 a side view of the vehicle 10 is shown. In this view the front wheels 48 and the rear wheels 50 can be seen. The wheels 48 and 50 are rotatably attached to a bottom portion or piston rod 52 of hydraulic cylinders 54. A top portion or cylinder 56 of the hydraulic cylinders 54 is attached to the bottom portion 16 of the frame 12. A chain drive housing 58 can be seen attached to the rear wheels 50. Inside the chain drivve housing 58 is a chain drive rotatably attached to linkage on the frame 12 which is attached to the vehicle's drive motor for driving the rear wheels 50. The hydraulic cylinders 54 are connected by any acceptable means to a hydraulic drive motor 60 mounted on the frame 12 which is driven by the drive motor inside the motor housing 42. By raising the top portion or cylinders 56, the frame 12 of the vehicle 10 can be raised above the height of the cultivated crop in a field.

In this view the ribbed conveyor 30 can be seen with the first section 36 and the second section 37. The first section 36 is rigidly attached to the top portion 14 of the frame 12 and to the rear of the reel housing 22. The second section 37 of the ribbed conveyor 30 is vertically adjustable so that the section 37 can be raised or lowered above storage hoppers having various heights.

Figure 3:
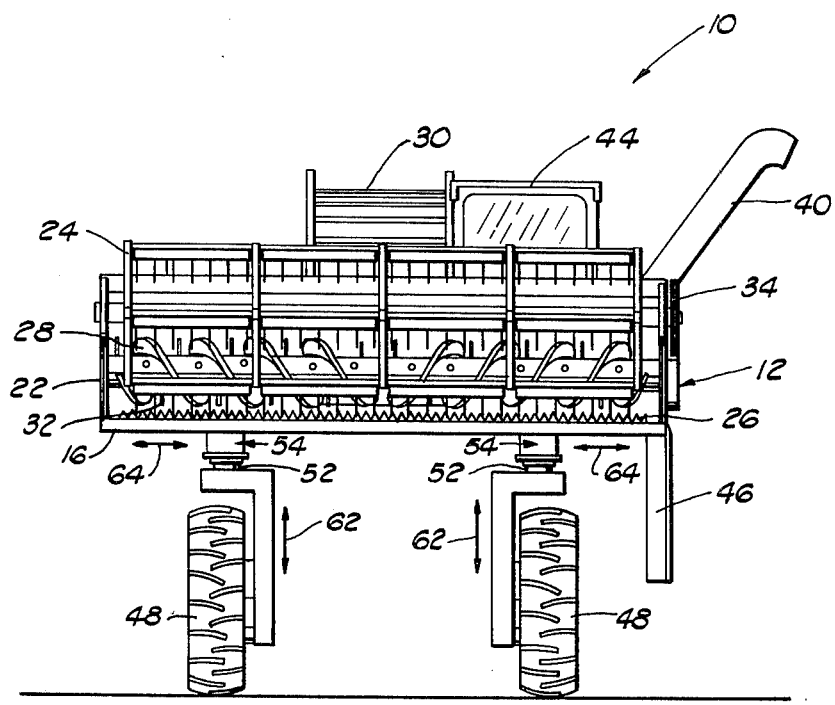
FIG. 3 is a front view of the vehicle.

In FIG. 3 a front view of the vehicle 10 is shown. In this view the hydraulic cylinders 54 can be seen attached to the front wheels 48. The movement of the hydraulic cylinders 54 vertically is indicated by arrows 62. The hydraulic cylinders 54 are adjustable on the bottom portion 16 of the frame 12 in a direction transverse to the direction of travel of the vehicle 10. The transverse adjustment of the cylinders 54 on the frame 12 is indicated by arrows 64.

Changes may be made in the construction and arrangement of the parts or elements of the embodiments as disclosed herein without departing from the spirit or scope of the inventin as defined in the following claims.

I claim:

1. A row crop rogue vehicle for removing seed heads from weeds or the like which are taller than cultivated crops in a field, the vehicle comprising:
   a vehicle frame having a top portion, bottom portion, front portion, and rear portion;
   a front pair of hydraulic cylinders and a rear pair of hydraulic cylinders, said cylinders having an upper portion and lower portion, the upper portion of said cylinders attached to the bottom of said frame;
   a pair of front wheels and a pair of rear wheels, said wheels rotatably attached to the lower portion of said cylinders;
   a cutting sickle attached to the front of said frame for cutting the seed heads;
   a rotary reel attached to the front portion of said frame;
   an auger attached to the front of said frame, said rotary reel feeding the cut seed heads to said auger;
   an endless chain driven ribbed conveyor mounted on the top portion of said frame and disposed adjacent said auger for receiving the cut seed heads from said auger;
   a storage hopper mounted on the top portion of said frame and positioned at the rear portion of said frame for receiving and storing the cut seed heads from said conveyor;
   a vehicle motor mounted on the top portion of said frame, said motor attached to and driving said wheels, said conveyor, said cutting sickle, said rotary reel, and said auger by a mechanical linkage;
   a hydraulic drive motor mounted on the top of said frame and driven by said vehicle motor and connected to said hydraulic cylinders for raising and lowering said cylinders thereby raising and lowering said vehicle frame above the cultivated crops; and
   steering means mounted on the top portion of said frame and attached to said wheels for guiding said wheels between the rows of the cultivated crops.

2. A row crop rogue vehicle for removing seed heads from weeds or the like which are taller than cultivated crops in a field, the vehicle comprising:
   a vehicle frame having a top portion, bottom portion, front portion, and rear portion;
   a front pair of hydraulic cylinders a rear pair of hydraulic cylinders, said cylinders having an upper portion and lower portion, the upper portion of said cylinders attached to the bottom of said frame;
   a pair of front wheels and a pair of rear wheels, said wheels rotatably attached to the lower portion of said cylinders;
   a cutting sickle attached to the front of said frame for cutting the seed heads;
   a rotary reel attached to the front portion of said frame;
   an auger attached to the front of said frame, said rotary reel feeding the cut seed heads to said auger, said auger including retractable tines therein for aiding in the movement of the cut seed heads;
   an endless chain driven ribbed conveyor mounted on the top portion of said frame and disposed adjacent said auger for receiving the cut seed heads from said auger;
   a storage hopper mounted on the top portion of said frame and positioned at the rear portion of said frame for receiving and storing the cut seed heads from said conveyor;
   a discharge hopper conveyor attached to the bottom of said hopper and extending outwardly and upwardly from one side of said hopper for discharging the seed heads from said hopper;
   a vehicle motor mounted on the top portion of said frame, said motor atacched to said rear wheels by a chain drive inside a chain drive housing, said housing mounted to said frame, said vehicle motor attached to and driving said conveyor, said cutting sickle, and rotary reel, and said auger by a mechanical linkage;
   a hydraulic drive motor mounted on the top portion of said frame and driven by said vehicle motor,, said hydraulic drive motor connected to said hydraulic cylinders for raising and lowering said cylinders thereby raising and lowering said vehicle frame above the cultivated crops; and
   steering means mounted on the top portion of said frame and attached to said wheels for guiding said wheels between the rows of the cultivated crop.

* * * * *